(12) United States Patent
Bharghavan et al.

(10) Patent No.: US 8,767,548 B1
(45) Date of Patent: *Jul. 1, 2014

(54) WIRELESS RATE ADAPTATION

(75) Inventors: Vaduvur Bharghavan, Morgan Hill, CA (US); Starsky Wong, Sunnyvale, CA (US); Hao Yang, Sunnyvale, CA (US); Songwu Lu, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/886,237

(22) Filed: Sep. 20, 2010

Related U.S. Application Data

(63) Continuation of application No. 11/525,246, filed on Sep. 20, 2006, now Pat. No. 7,808,908.

(60) Provisional application No. 60/846,185, filed on Sep. 20, 2006.

(51) Int. Cl.
*H04J 1/16* (2006.01)
*H04W 28/22* (2009.01)

(52) U.S. Cl.
CPC ............................. *H04W 28/22* (2013.01)
USPC ......................................... 370/235; 370/252

(58) Field of Classification Search
CPC ........................................................ H04W 28/22
USPC ......... 370/229, 235, 241, 252, 310, 328, 329, 370/331–333
See application file for complete search history.

(56) References Cited

U.S. PATENT DOCUMENTS

| | | | |
|---|---|---|---|
| 5,038,151 A | 8/1991 | Kaminski | |
| 5,966,094 A | 10/1999 | Ward et al. | |
| 6,163,808 A * | 12/2000 | Kilkki | 709/233 |
| 6,415,410 B1 | 7/2002 | Kanerva et al. | |
| 6,574,213 B1 | 6/2003 | Anandakumar et al. | |
| 6,760,318 B1 | 7/2004 | Bims | |
| 6,782,271 B2 * | 8/2004 | Huh et al. | 455/522 |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channapasappa et al. | |
| 6,978,158 B2 | 12/2005 | Ghavami | |
| 6,993,689 B2 * | 1/2006 | Nagai et al. | 714/717 |

(Continued)

OTHER PUBLICATIONS

Satosohi Futemma et al., TFRC-based Rate Control Scheme for Real-time JPEG 2000 Video Transmission, IEEE Publication 2005.*

(Continued)

*Primary Examiner* — Chi Pham
*Assistant Examiner* — Robert Lopata
(74) *Attorney, Agent, or Firm* — Law Office of Dorian Cartwright

(57) ABSTRACT

A method of adapting wireless transmission rates that includes the steps of determining at least a short-term loss ratio for wireless communication during a window of time, and adapting a transmission rate responsive to at least the short-term loss ratio, a maximum tolerable loss threshold for the communication during the window, and an opportunistic rate increase threshold for the communication during the window. A size of the window, the maximum tolerable loss threshold, and the opportunistic rate increase threshold are responsive to the transmission rate used for the communication. Preferably, the window is re-started if the transmission rate changes. Also, systems, devices, and memories that embody the foregoing.

22 Claims, 3 Drawing Sheets

(56) References Cited

U.S. PATENT DOCUMENTS

| | | | |
|---|---|---|---|
| 7,301,965 B2 | 11/2007 | Cimini et al. | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,436,789 B2 | 10/2008 | Caliskan et al. | |
| 7,606,164 B2 | 10/2009 | Anandakumar et al. | |
| 7,808,908 B1 * | 10/2010 | Bharghavan et al. | 370/235 |
| 7,944,839 B2 * | 5/2011 | Siris | 370/236 |
| 8,014,340 B2 * | 9/2011 | Tidwell | 370/328 |
| 2002/0068588 A1 | 6/2002 | Yoshida et al. | |
| 2002/0186660 A1 | 12/2002 | Bahadiroglu | |
| 2005/0078672 A1 | 4/2005 | Caliskan | |
| 2005/0152314 A1 | 7/2005 | Sun et al. | |
| 2007/0070892 A1 | 3/2007 | Lee et al. | |

OTHER PUBLICATIONS

Habib et al. "Multi-Antenna Techniques for OFDM Based WLAN." Proceedings of First International Conference on Next-Generation Wireless Systems, Jan. 2006, pp. 186-190.

Kitahara et al. "A Base Station Adaptive Antenna for Downlink Transmission in a DS-CDMA System." IEEE 51st Vehicular Technology Conference Proceedings, 2000 (Abstract).

Mahler et al. "Design and Optimisation of an Antenna Array for WiMAX Base Stations." IEEE/ACES International Conference on Wireless Communications and Applied Computational Electromagnetics, 2005 (Abstract).

Miaris et al. "On the Base Stations Antenna System Design for Mobile Communications." Electrical Engineering, 2006, pp. 157-163, vol. 88.

Miura et al. "Study of Array Pattern Tuning Method Using Hybrid Genetic Algorithms for Figure-8 Satellite's Earth Station Antenna." Asia-Pacific Microwave Conference Proceedings, 2000 (Abstract).

Ponnapalli et al. "Design and Packaging of Antennas for Wireless Systems." Proceedings of Electrical Performance of Electrical Packaging, 1995 (Abstract).

Sarolic. "Base Station Antenna Near-Field Radiation Pattern Distortion Analysis." Sixth International Conference on Computational Methods for the Solution of Electrical and Electromagnetic Engineering Problems Incorporating Electromagnetic Effects on Human Beings and Equipment Seminar, 2003 (Abstract).

* cited by examiner

WIRELESS RATE ADAPTATION

CROSS REFERENCE TO RELATED PROVISIONAL APPLICATION

This application claims priority from U.S. patent application Ser. No. 11/525,246, entitled "Wireless Rate Adaptation," filed Sep. 20, 2006, which claims priority from Provisional Application No. 60/846,185, entitled "Rate Adaptation for 802.11 Wireless Networks," filed Sep. 20, 2006, Express Mail No. EV 875 991 535 US, in the name of the same inventors ("The Provisional Application"), both of which are hereby incorporated by reference as if fully set forth herein.

BACKGROUND OF THE INVENTION

1. Field of the Invention

This invention relates to rate adaptation in a wireless communication setting.

2. Related Art

In wireless networks such as IEEE 802.11 WLANs (wireless local area networks) or IEEE 802.11-based mesh networks, one or more access points communicate with one or more client devices such as wireless enabled computers and personal data assistants. Rate adaptation is used in such wireless networks in order to try to adapt a wireless connection to changes in network conditions. These changes can include, but are not limited to, one or more of changes in noise, signal strength, position, the number of client devices that contend for the shared channel, and available access points. These changes can be caused by one or more of random channel errors, user mobility, and collisions, to be elaborated below, as well as possibly by other factors.

Sometimes a device communicating with an access point will experience random fluctuations in its signal-to-noise ratio due to effects of fading and contention. This will lead to changes in wireless transmission quality, and may result in random data losses at a given transmission rate. This issue is referred to as a "random channel error" problem.

Sometimes a device communicating with an access point will move toward the access point or away from the access point. This will lead to increase or decrease in the physical signal. The transmission rate should adapt to such changes in channel quality caused by mobility.

Sometimes a device communicating with an access point will experience "collisions" for its transmission. Such collisions can be caused by "hidden terminals" or contentions. The "hidden terminal" problem occurs when two terminals, which are out of range of one another, wish to send data simultaneously over the same wireless channel, but the signals collide with one another at their respective receivers. A hidden terminal can be either an access point or a client device. Contentions occur when several devices communicating with the same access point send data simultaneously, and lead to data losses at the receiving access point.

Several existing rate adaptation techniques exist to try to alleviate or otherwise handle these problems. The existing techniques are generally based on five guidelines. These guidelines are (1) decrease transmission rate upon sever packet loss, (2) use probe packets to assess new and hopefully more effective rates, (3) use consecutive transmission successes/looses to decide rate increases/decreases, (4) use PHY (i.e., physical layer) metrics to infer new transmission rates, and (5) attempt to smooth long-term operation to produce a best average performance.

Each of the foregoing guidelines makes intuitive sense and appears to work well in simple pre-defined environments. However, these guidelines often result in less than acceptable results in dynamic real-world contexts, especially in the case of random channel errors, hidden terminals, contentions, and moving client devices.

SUMMARY OF THE INVENTION

The invention addresses the foregoing concerns with a new type of rate adaptation. One embodiment of the invention is a method of adapting wireless transmission rates that includes the steps of determining at least a short-term loss ratio for wireless communication during a window of time, and adapting a transmission rate responsive to at least the calculated short-term loss ratio, a maximum tolerable loss threshold for the communication during the window, and an opportunistic rate increase threshold for the communication during the window. A size of the short-term window, the maximum tolerable loss threshold, and the opportunistic rate increase threshold are varied for different transmission rate used for the communication. Preferably, the window is re-started when the transmission rate changes.

In some embodiments, the wireless communication uses packets of different sizes. In those embodiments, the sizes can be divided into groups, and the determining and adapting steps can be performed for each of the groups.

The size of the window preferably is measured in frames. In that case, a lost frame count preferably is used to represent the short-term loss ratio, the maximum tolerable loss threshold, and the opportunistic rate increase threshold.

In a preferred embodiment, the rate adaptation also includes the step of using RTS/CTS messages during an RTS/CTS window, which also preferably is measured in frames. Several rules can be used to adjust this RTS/CTS window. A preferred embodiment of these rules includes the following: (1) The RTS/CTS window is initially set to zero when no frame loss occurs; (2) the RTS/CTS window is increased in size if successful communication does not occur in a frame when the RTS/CTS messages are not being used; (3) the RTS/CTS window is halved in size if successful communication does not occur in a frame when the RTS/CTS messages are being used, or if successful communication does occur when the RTS/CTS messages are not being used; and (4) the RTS/CTS window stays a same size if successful communication does occur when the RTS/CTS messages are being used.

If RTS/CTS messages are used, determination of the short-term loss ratio for rate adaptation preferably does not count frames that have the RTS/CTS messages and that fail to be communicated.

The invention also encompasses a system that performs these methods, as well as other possible embodiments of systems, devices, memories, and the like that embody the foregoing.

This brief summary has been provided so that the nature of the invention may be understood quickly. A more complete understanding of the invention may be obtained by reference to the following description of the preferred embodiments thereof in connection with the attached drawings.

DETAILED DESCRIPTION OF THE INVENTION

System Elements

Figure 1:
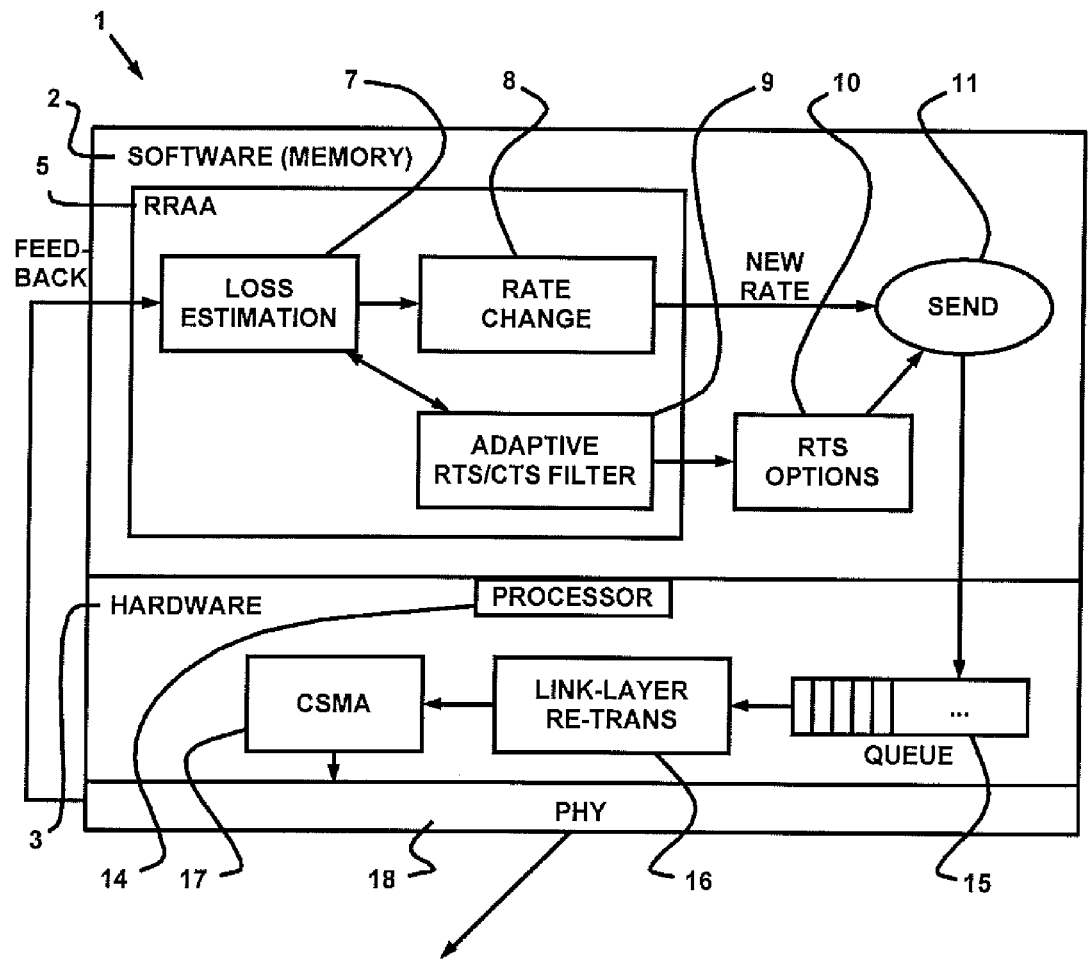
FIG. 1 shows a system that can perform wireless rate adaptation according to an embodiment of the invention.

FIG. 1 shows a system that can perform wireless rate adaptation according to an embodiment of the invention.

Briefly, an embodiment of a system that adapts wireless transmission rate includes at least a loss estimation module and a rate change module. The loss estimation module determines a short-term loss ratio for communication during a window of communication. The rate change module adapts the transmission rate responsive to at least the short-term loss ratio, a maximum tolerable loss threshold for the communication during the window, and an opportunistic rate increase threshold for the communication during the window. Preferably, a size of the short-term window, the maximum tolerable loss threshold, and the opportunistic rate increase threshold are responsive to the transmission rate used for the communication. The system also preferably includes an adaptive RTS/CTS (request-to-send and clear-to-send) filter that uses RTS/CTS messages during an RTS/CTS window.

In more detail, FIG. 1 shows system 1 that implements wireless communication. The system could be located in, for example, an access point (AP) for a wireless computer network. The system can be used in other communication systems such as a client device as well.

The wireless communication preferably is frame based under the IEEE 802.11 standard and is over one or more wireless communication channels (not shown). In a frame-based system, data packets are sent in frames along with control information and the like. Other standards can be used.

The system in FIG. 1 includes software 2 and hardware 3.

Software 2 preferably is stored in a memory and includes robust rate adaptation algorithm (RRAA) 5. This algorithm in turn includes loss estimation module 7, rate change module 8, and adaptive RTC/CTS filter 9. In a preferred embodiment, software 2 also includes RTS options module 10 and send module 11.

Loss estimation module 7 assesses short-term channel conditions, preferably by keeping track of a frame loss ratio within a small time window such as five to forty frames. Such a window is also referred to as a "short-term" window herein. In this context, "short-term" generally refer to conditions or windows lasting tens of milliseconds to a few seconds. A "few seconds" refers to any number of seconds between two and ten, including possibly fractions of seconds (e.g., 2½ seconds). The invention is not limited to these time frames; in alternative embodiments, smaller or larger channel conditions and time windows can be used.

Rate change module 8 increases, decreases, or maintains a transmission rate over the communication channels responsive to the wireless channel conditions. The transmission rates are determined by various channel characteristics (i.e., communication parameters), preferably according to the 802.11a/b/g standards. For example, the transmission rate can be determined by varying symbol rate, error correction scheme, and quadrature type. Transmission rates can be determined using other characteristics and under other standards.

In one embodiment, possible transmission rates are 1, 2, 5.5, and 11 Mbps (megabytes per second). In another embodiment, possible transmission rates are 6, 9, 12, 18, 24, 36, 48, and 54 Mbps. In a further embodiment, possible transmission rates are 1, 2, 5.5, 6, 9, 11, 12, 18, 24, 36, 48, and 54 Mbps. Other possible transmission rates can be used.

Adaptive RTS/CTS filter 9 preferably controls use of RTS/CTS messages to help handle collisions, for example as can be caused by a "hidden terminal". RTS/CTS option module 10 preferably performs RTS/CTS collision handling responsive to information from adaptive RTS/CTS filter 9.

Send module 11 preferably sends frames to hardware 3 for actual transmission over the wireless communication channel(s). Alternatively, the communication could be packet based.

Hardware 3 preferably includes processor 14 for executing software, queue 15, link-layer re-transmission module 16, carrier sense multiple access (CSMA) module 17, and physical (PHY) layer 18.

Queue 15 stores preferably frames for actual transmission. Link-layer re-transmission module 16 pulls those frames off of queue 15 for transmission. In a case that a frame is transmitted successfully, link-layer re-transmission module 16 pulls a next frame from queue 15. In a case that a frame is not transmitted successfully, link-layer re-transmission module 16 attempts to re-transmit that frame until either it is successfully transmitted or the frame is discarded (e.g., due to timeout or too many failed attempts).

CSMA module 17 handles multiplexing of frames over the PHY layer 18 of the wireless communication channel(s), again preferably in accordance with the 802.11 standard. In some embodiments, CSMA module 17 also includes hardware and firmware for collision avoidance (CA).

PHY layer 18 is a physical layer of the wireless communication channel(s), including for example an actual transmitter, a receiver and the like. System 1 can communicate with client devices, for example but not limited to wireless enabled computers and personal data assistants, through the PHY layer.

These same elements preferably can serve corresponding tasks for reception over the wireless communication channel(s), as would be evident to one skilled in the art.

Assessing short-term channel conditions, adapting transmission rates, and adaptive RTS/CTS filter are explained in more details below with respect to FIGS. 2 and 3.

Method of Operation

Steps for one possible embodiment of the invention are discussed below with reference to FIGS. 2 and 3. Preferably, the steps are executed in the order shown. However, the invention also encompasses embodiments in which the steps are executed in different orders, where possible, and in different arrangements, for example in parallel.

Figure 2:
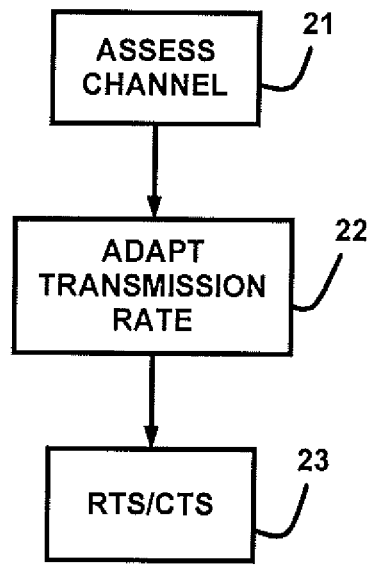
FIG. 2 shows a flowchart of wireless rate adaptation according to an embodiment of the invention.

FIG. 2 shows a flowchart of wireless rate adaptation according to an embodiment of the invention.

In step 21, channel conditions are assessed. Preferably in this step, at least one short-term loss ratio is determined for wireless communication during a window of time. Preferably, a size of the window is measured in frames. In that case, a preferred formula for measuring the short-term loss ratio P is:

$$P = \text{(number of lost frames)}/\text{(number of transmitted frames)}$$

A lost frame is a frame that, for whatever reason, is not successfully transmitted over the wireless communication channel(s). Lost frames could be determined, for example, by a lack of ACK (acknowledgement) messages or by a presence of NACK (no acknowledgement) messages from a target of the communication. Other methods of determining a number of lost frames can be used. In a preferred embodiment, the number of lost frames includes all retries.

The transmission rate is adapted in step 22. The transmission rate preferably is adapted responsive to at least the short-term loss ratio, a maximum tolerable loss threshold ($P_{MTL}$) for the communication during the window, and an opportunistic rate increase threshold ($P_{ORI}$) for the communication during the window.

In a preferred embodiment, the transmission rate is decreased to a next lower rate if the short-term loss ratio P is greater than the maximum tolerable loss threshold. Likewise, the transmission rate is increased to a next higher rate if the short-term loss ratio P is less than the opportunistic rate increase threshold.

A size of the short-term window, the maximum tolerable loss threshold, and the opportunistic rate increase threshold preferably are responsive to the transmission rate used for the communication.

The thresholds can be determined in various ways. In one embodiment, $P_{MTL}$ for a give transmission rate R is determined relative to a critical loss threshold. This critical loss threshold is the point where losses at the current level result in throughput equal to lossless transmission at the next lower level. This critical loss threshold is multiplied by a tuning factor alpha because transmission at the next lower level most likely is not actually going to be lossless. The following formula implements this approach:

$$P_{MTL}(R_{current}) = alpha * (1 - Throughput\ at\ (R_{next\ lowest}) / Throughput\ at\ (R_{current}))$$

$P_{ORI}$ preferably is determined to prevent rapid bouncing back and forth between transmission rates. In one embodiment, $P_{ORI}$ is one half of $P_{MTL}$ for the transmission rate that is the next higher level of a given transmission rate.

The window varies with the transmission rate to balance conflicting needs of obtaining meaningful short-term statistics (i.e., short-term loss ratios) and avoiding use of obsolete information. In addition, the window for measuring the loss ratio preferably is restarted if the transmission rate is changed.

If alpha is 1.25, the foregoing results in the threshold values shown in the following table. This table also shows examples of window sizes in frames (ewnd) for determining loss ratios:

| Rate (Mbps) | $P_{ORI}$ (%) | $P_{MTL}$ (%) | Ewnd (frames) |
|---|---|---|---|
| 6 | 50.00 | N/A | 6 |
| 9 | 14.34 | 39.32 | 10 |
| 12 | 18.61 | 28.68 | 20 |
| 18 | 13.25 | 37.22 | 20 |
| 24 | 16.81 | 26.50 | 40 |
| 36 | 11.50 | 33.63 | 40 |
| 48 | 4.70 | 23.00 | 40 |
| 54 | N/A | 9.40 | 40 |

Other methods, techniques, and values can be used to determine the thresholds and window size without departing from the invention.

Pseudo-code that implements an embodiment of steps 21 and 22 follows:

R=highest rate/*R is the current transmission rate; starts at highest here*/
counter=ewnd(R); /*ewnd is the short-term window for measuring the loss ratio*/
while true do
rcv_tx_status (last_frame)
P=update_short_term_loss_ratio;
if (counter==0) then
  if (P>$P_{MTL}$(R)) then
    R=next_lower_rate;
  else if (P<$P_{ORI}$(R)) then
    R=next_higher_rate;
  end
  counter=ewnd(R);
end
send(next_frame,R)/*send the next frame at transmission rate R*/
couter-;
end In some embodiments, a single communication channel can use packets of different sizes. A preferred embodiment of the invention handles this issue by dividing the sizes info groups, and performing steps 21 and 22 for each group independent of the other. In other words, transmission rates are determined independently for frames of different sizes. Alternatively, one transmission rate could be used for all frames. Other approaches for handling different packet sizes are possible within the scope of the invention.

In one implementation, the chipset used for the wireless communication does not include floating point capability. One embodiment of the invention addresses this issue by converting the above ratios and thresholds to frame counts based on the window size. For example, if a window is 20 frame long, then a $P_{ORI}$ of 50% corresponds to a count of 10 frames. In other implementations and embodiments, floating point capability is available and can be used.

In some embodiments of the invention, called "BASIC," only steps 21 and 22 are performed. In other embodiments, step 23 also is performed.

In step 23, RTS/CTS messages are used to address inefficient transmission rate decreases that can result from frame collisions, for example (but not limited to) those caused by so-called "hidden terminals".

Preferably, RTS/CTS messages are used only during an "on" period for a number of frames corresponding to an RTS/CTS window. The size of this window preferably is adapted based on various factors.

In one embodiment, whether or not a frame is within the RTS/CTS window is determined by a two-variable system. The first variable is RTSwnd, a window size in frames during which RTS/CTS is turned on for all transmitted frames. The second variable is $RTS_{ent}$, a count of the number of frames sent with RTS/CTS turned on.

$RTS_{wnd}$ preferably starts at zero frame, which disables RTS/CTS messages.

When a frame is lost without RTS/CTS turned on, $RTS_{wnd}$ is incremented by one because the loss was potentially caused by a collision.

If a frame transmitted with RTS/CTS turned on is lost, $RTS_{wnd}$ is halved because RTS did not prevent the loss, which therefore probably was not caused by a collision. Likewise, if a frame successfully transmitted with RTS/CTS turned off, $RTS_{wnd}$ is halved because the frame was successful and no collision occurred. Because $RTS_{wnd}$ is an integer (in a preferred embodiment), half of an $RTS_{wnd}$ of one is considered to be zero, allowing RTS/CTS to be turned off.

If a frame is successfully transmitted with RTS/CTS turned on, $RTS_{wnd}$ is not changed because RTS/CTS might have been responsible for overcoming a collision.

If $RTS_{wnd}$ is changed after a frame, $RTS_{ent}$ is set equal to $RTS_{wnd}$. Otherwise, $RTS_{ent}$ is decremented after each frame that is transmitted with RTS/CTS turned on.

Pseudo-code the implements the foregoing follows:
RTSwnd=0;
RTScnt=0;
while true do
rcv_tx_status (last_frame);
if (!RTSOn and !Success) then
  RTSwnd++;
  RTScnt=RTSwnd;

```
else if (RTSOn XOR Success) then
    RTSwnd=RTSwnd/2;
    RTScnt=RTSwnd;
end
if (RTScnt>0) then
    TurnOnRTS (next_frame);
    RTScnt-;
end
end
```

Figure 3:
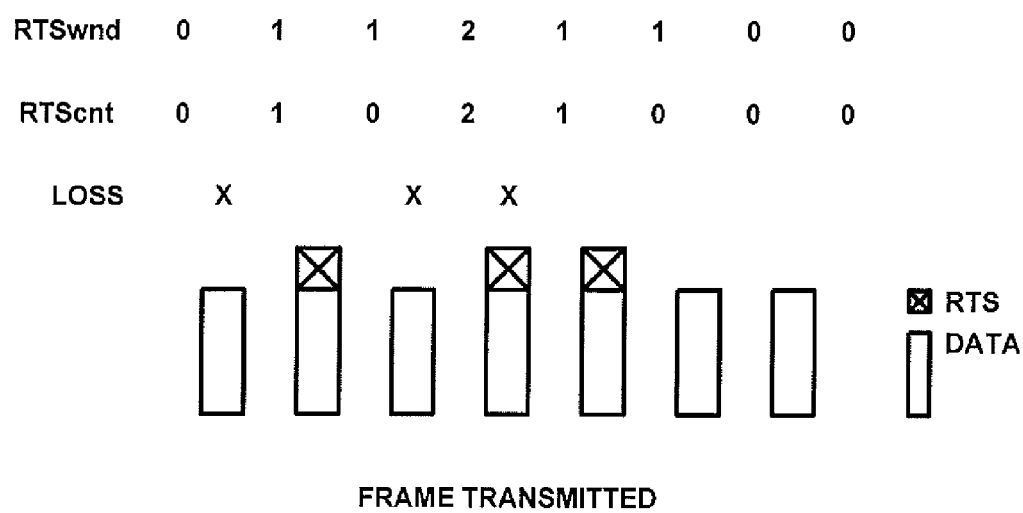
FIG. 3 shows an example of RTS/CTS window evolution according to an embodiment of the invention.

FIG. 3 shows an example of RTS/CTS window evolution according to the foregoing.

The foregoing is intended to result in a system that gradually increases RTS/CTS usage in the presence of collision losses. In addition, when collisions are mild or absent, RTS/CTS usage should be decreased.

In a preferred embodiment, RTS/CTS message frames that fail to resolve a collision are not counted in the loss ratio of the channel assessment in step 21. This helps address problems of over-estimating the loss ratio that could occur due to failed RTS/CTS message frames, which could fail for reasons other than channel characteristics. One such reason is continued RTS/CTS collisions with a hidden terminal.

Thus, a preferred embodiment needs to be able to determine if a failed frame transmission is due to channel characteristics or due to failure of RTS/CTS to resolve a collision. Many chipsets do not provide this information. However, most chipset do provide feedback from the PHY layer in the form of timestamps. Because RTS/CTS messages are shorter than data messages, these timestamps can be used to determine if failures are of frames with RTS/CTS messages or with data. A preferred embodiment of the invention does this by comparing the timestamps to a transmission time predicted if no frames with RTS/CTS messages are present. Alternatively, if the chipset provides this information, it can be used directly. Furthermore, the invention is not limited to these two approaches to determining if failed frames contain RTS/CTS messages or data.

The foregoing approach has been found to be better than that implemented in RTS/CTS firmware or hardware in the CSMA/CA module in most chipsets. The chipset's RTS/CTS messaging typically is enabled when severe collision problems are detected by the chipset. Thus, in a preferred embodiment, the chipset's RTS/CTS is overridden by the foregoing approach when severe collisions are detected. Most chipset include a specific line or signal for doing this. In one embodiment, a $RTS_{wnd}$ of 3 indicates such severe collisions. Other measures of collisions can be used to determine when to override the chipset's RTS/CTS messaging, if at all.

Technical Appendix and Provisional Application

This application is accompanied by a Technical Appendix entitled "Rate Adaptation for 802.11 Wireless Networks," authored by the inventors. This Technical Appendix is hereby incorporated by reference as if fully set forth herein. The Provisional Application also includes this article. The Technical Appendix and the Provisional Application describe one preferred embodiment of the invention. The invention is not limited to the particular details of that embodiment.

Generality of Invention

In the preceding description, a preferred embodiment of the invention is described with regard to preferred system elements, process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

What is claimed is:

1. A computer-implemented method of adapting wireless transmission rates of frames in a computer network, comprising the steps of:
    determining, by a computer, at least a short-term loss ratio for wireless communication of frames in the computer network during a window of time; and
    adapting a transmission rate responsive to at least the short-term loss ratio of frames, a maximum tolerable loss threshold for the communication during the window, and an opportunistic rate increase threshold for the communication during the window, the maximum tolerable loss threshold based on a critical loss threshold wherein losses at a current level result in throughput equal to substantially lossless transmission at a lower level;
    wherein a size of the window, the maximum tolerable loss threshold, and the opportunistic rate increase threshold are responsive to the transmission rate used for the communication.

2. A method as in claim 1, wherein the short-term loss ratio is a loss ratio determined over tens of milliseconds to a few seconds.

3. A method as in claim 1, wherein the window is re-started if the transmission rate changes.

4. A method as in claim 1, wherein the communication uses packets of different sizes, the sizes are divided into groups, and the determining and adapting steps are performed for each of the groups.

5. A method as in claim 1, wherein a frame count is used to represent the short-term loss ratio, the maximum tolerable loss threshold, and the opportunistic rate increase threshold.

6. A method as in claim 1, further comprising the step of:
initially turning off RTS/CTS (Request-to-Send/Clear-to-Send) messages;
detecting a frame loss while the RTS/CTS messages are turned off;
responsive to the detected frame loss, gradually increasing the use RTS/CTS messages during an RTS/CTS window; and
responsive to a reduction in detecting frame loss, gradually reducing the use of RTS/CTS messages or turning off the RTS/CTS messages.

7. A method as in claim 6, wherein the size of the RTS/CTS window is measured in frames.

8. A method as in claim 7, wherein the RTS/CTS window is increased in size if successful communication does not occur in a frame when the RTS/CTS messages are not being used.

9. A method as in claim 7, wherein the RTS/CTS window is halved in size if successful communication does not occur in a frame when the RTS/CTS messages are being used, or if successful communication does occur when the RTS/CTS messages are not being used.

10. A method as in claim 7, wherein the RTS/CTS window stays a same size if successful communication does occur when the RTS/CTS messages are being used.

11. A method as in claim 7, wherein determination of the short-term loss ratio does not count frames that have the RTS/CTS messages and that fail to be communicated.

12. A system that adapts wireless transmission rates of frames in a computer network, comprising:
a processor;
a memory, comprising:
a loss estimation module that determines at least a short-term loss ratio for wireless communication of frames in the computer network during a window of time; and
a rate change module that adapts a transmission rate responsive to at least the short-term loss ratio of frames, a maximum tolerable loss threshold for the communication during the window, and an opportunistic rate increase threshold for the communication during the window, the maximum tolerable loss threshold based on a critical loss threshold wherein losses at a current level result in throughput equal to substantially lossless transmission at a lower level;
wherein a size of the window, the maximum tolerable loss threshold, and the opportunistic rate increase threshold are responsive to the transmission rate used for the communication.

13. A system as in claim 12, wherein the short-term loss ratio is a loss ratio determined over tens of milliseconds to a few seconds.

14. A system as in claim 12, wherein the window is re-started if the transmission rate changes.

15. A system as in claim 12, wherein the communication uses packets of different sizes, the sizes are divided into groups, and the determining and adapting steps are performed for each of the groups.

16. A system as in claim 12, wherein a frame count is used to represent the short-term loss ratio, the maximum tolerable loss threshold, and the opportunistic rate increase threshold.

17. A system as in claim 12, further comprising an adaptive RTS/CTS filter that uses RTS/CTS messages during an RTS/CTS window.

18. A system as in claim 17, wherein the size of the RTS/CTS window is measured in frames.

19. The method of claim 1, further comprising:
dividing packets into a plurality of groups as determined by size, wherein the transmission rate of a first group is adapted independently of a transmission rate for a second group.

20. The method of claim 1, further comprising:
detecting a an RTS/CTS signal from a chipset; and
overriding the RTS/CTS signal of the chipset when a threshold number of collisions are detected.

21. A computer-implemented method of selectively adapting wireless transmission rates of frames in a computer network, comprising the steps of:
determining whether frames are being lost due to channel characteristics or due to a failure of RTS/CTS (Request-to-Send/Clear-to-Send) messages to resolve collisions;
responsive to determining that frames are being lost due to channel characteristics, adapting the transmission rate, comprising the steps of:
determining, by a computer, at least a short-term loss ratio for wireless communication of frames in the computer network during a window of time; and
adapting a transmission rate responsive to at least the short-term loss ratio of frames, a maximum tolerable loss threshold for the communication during the window, and an opportunistic rate increase threshold for the communication during the window,
wherein a size of the window, the maximum tolerable loss threshold, and the opportunistic rate increase threshold are responsive to the transmission rate used for the communication; and
responsive to determining that frames are being lost due to the failure of RTS/CTS messages, performing a different action.

22. The method of claim 21, wherein determining whether frames are being lost due to channel characteristics or due to a failure of RTS/CTS messages to resolve collisions comprises:
receiving timestamps from a PHY layer of transmission for frames;
comparing the timestamps to a transmission time predicted if no frames with RTS/CTS messages are present.

* * * * *